(12) United States Patent
Tsuge et al.

(10) Patent No.: US 6,349,613 B1
(45) Date of Patent: Feb. 26, 2002

(54) MECHANISM FOR AUTOMATICALLY SETTING PUSH-PULL CONTROL CABLE DEVICE IN STANDBY/CANCEL MODE

(75) Inventors: Yoshikatsu Tsuge, Nagoya; Yoshio Misaki, Aichi-ken, both of (JP)

(73) Assignee: Chuouhatsujo Kabushiki Kaisha (JP)

( * ) Notice: Subject to any disclaimer, the term of this patent is extended or adjusted under 35 U.S.C. 154(b) by 0 days.

(21) Appl. No.: 08/728,829

(22) Filed: Oct. 10, 1996

(30) Foreign Application Priority Data

Oct. 13, 1995 (JP) ............................................. 7-292037

(51) Int. Cl.[7] ................ F16C 1/10; F16C 1/22
(52) U.S. Cl. .................. 74/501.5 R; 74/502.6
(58) Field of Search ............ 74/501.5 R, 502.6; 474/82, 87, 70

(56) References Cited

U.S. PATENT DOCUMENTS 4,753,325 A * 6/1988 Jaksic .................... 74/502.6 X
4,991,700 A * 2/1991 Koga ................. 74/501.5 R X

* cited by examiner

Primary Examiner—David A. Bucci
Assistant Examiner—Marcus Charles
(74) Attorney, Agent, or Firm—Lackenbach Siegel

(57) ABSTRACT

A push-pull control cable device for automatically setting same in standby or a cancel mode. The device has an outer casing tube on which a tubular cap has an end fixed stationary relative thereto. An inner cable extends longitudinally guided through the tubular cap and into the device's outer casing tube for transmission of a desired control force. A member slidable axially in the tubular casing is disposed adjacent an opposite end thereof and has a reduced diameter tubular portion extending axially from the tubular cap. Inner cable extends through an opening in the slidable member and has terminal end extending into the tubular portion. A terminal block fixed to the terminal end is slidable in the tubular portion. An intermediate block slidable in the tubular cap is fixed to the inner cable spaced axially from the slidable member. A coil spring between intermediate block and the slidable member applies in an extended state a biasing force effectively causing the terminal block to bear against the slidable member in the absence of a force in the device restraining the inner cable from travel longitudinally toward the device so that the device assumes an operational standby mode for application of a push-pull control force by the depression of the slidable element or pulling it in a direction away from the device.

2 Claims, 2 Drawing Sheets

MECHANISM FOR AUTOMATICALLY SETTING PUSH-PULL CONTROL CABLE DEVICE IN STANDBY/CANCEL MODE

BACKGROUND OF THE INVENTION

1. Field of the Invention

The present invention relates to a mechanism used in conjunction with a push-pull control cable device consisting of an inner cable slidably guided through an outer tube serving for transmission of a control force in a push and pull direction and adapted for automatically setting this push-pull control cable device in a standby or a cancel mode depending on an existing condition wherein said mechanism comprises a manipulating member fixed to a proximate end of the inner cable so that a depressing force applied to the manipulating member which is normally transmitted via a coil spring to the inner cable is absorbed by a coil spring and consequently the inner cable is not actuated by such depressing force so long as a distal end of the inner cable is bearing against a stationary member.

2. Description of the Prior Art

A mechanism of this type is well known which comprises a casing cap, a guide cylinder slidably received by said casing cap, a terminal metallic block and a manipulating member both fixed to a proximate end of inner cable so as to lie at opposite ends of said guide cylinder and operatively associated with each other via a coil spring slidably receives the guide cylinder in such a manner in which depression of the manipulating member merely causes compression of the coil spring without actuating the inner cable so long as a distal end of the inner cable is bearing against a stationary member.

However, such known mechanism has various drawbacks such that adoption of the guide cylinder necessarily enlarges the outer diameter of the casing cap, making the mechanism bulky. The guide cylinders of different sizes must be prepared depending on particular strokes specified for automatically setting the push-pull control device in standby or cancel mode necessarily with an increased manufacturing cost.

SUMMARY OF THE INVENTION

Accordingly, it is a principal object of the invention to make such mechanism as compact as possible at a reasonably low manufacturing cost.

The object set forth above is achieved, according to the invention, by a mechanism for automatically setting a push-pull control cable device in a mode of standby or cancel depending on an existing condition, said mechanism comprising a cylindrical casing cap mounted on a stationary member, on one hand, and immovably fitted on a proximate end of an outer casing for the push-pull control cable device, on the other hand, said outer casing allowing slidable passage of inner cable therethrough, an intermediate metallic block slidably received by said casing cap and fixed to said inner cable, a manipulating member including a cylindrical proximate end portion projecting rearward from said casing cap and a distal end portion slidably received by said casing cap, said distal end portion being centrally formed with an opening for passage of said inner cable, a terminal metallic block fixed to one end of said inner cable behind said opening of said manipulating member, and a coil spring disposed between said intermediate metallic block and said manipulating member.

Under the condition as has been mentioned above, depression of the manipulating member over a predetermined stroke is absorbed by compression of the coil spring and thereby the push-pull control cable device is automatically set in standby/cancel mode. The casing cap is effectively miniaturized by directly fitting the manipulating member into the casing cap without interposition of the guide cylinder. Furthermore, the stroke for neutralizing effect can be easily adjusted by shifting a position at which the intermediate metallic block is fixed to the inner cable and thus the devices of different strokes specified for automatically setting the push-pull control device in standby/cancel can be manufactured at a reasonably low cost.

DESCRIPTION OF THE PREFERRED EMBODIMENT

Figure 1:
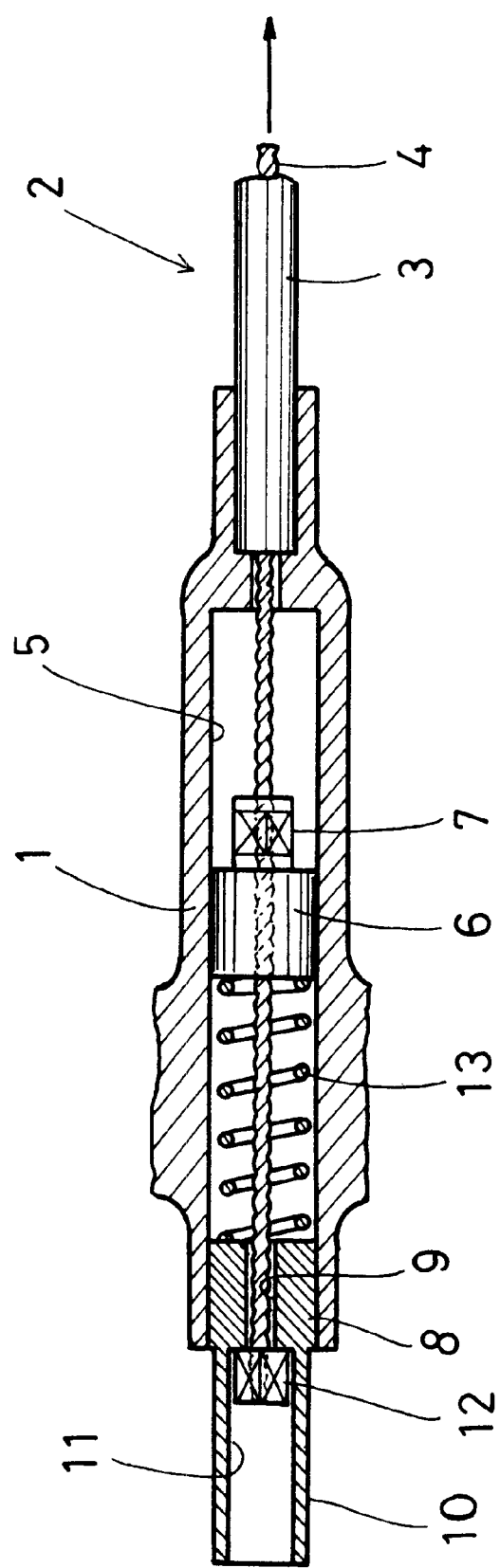
FIG. 1 is a sectional view showing an embodiment of the invention.
Figure 2:
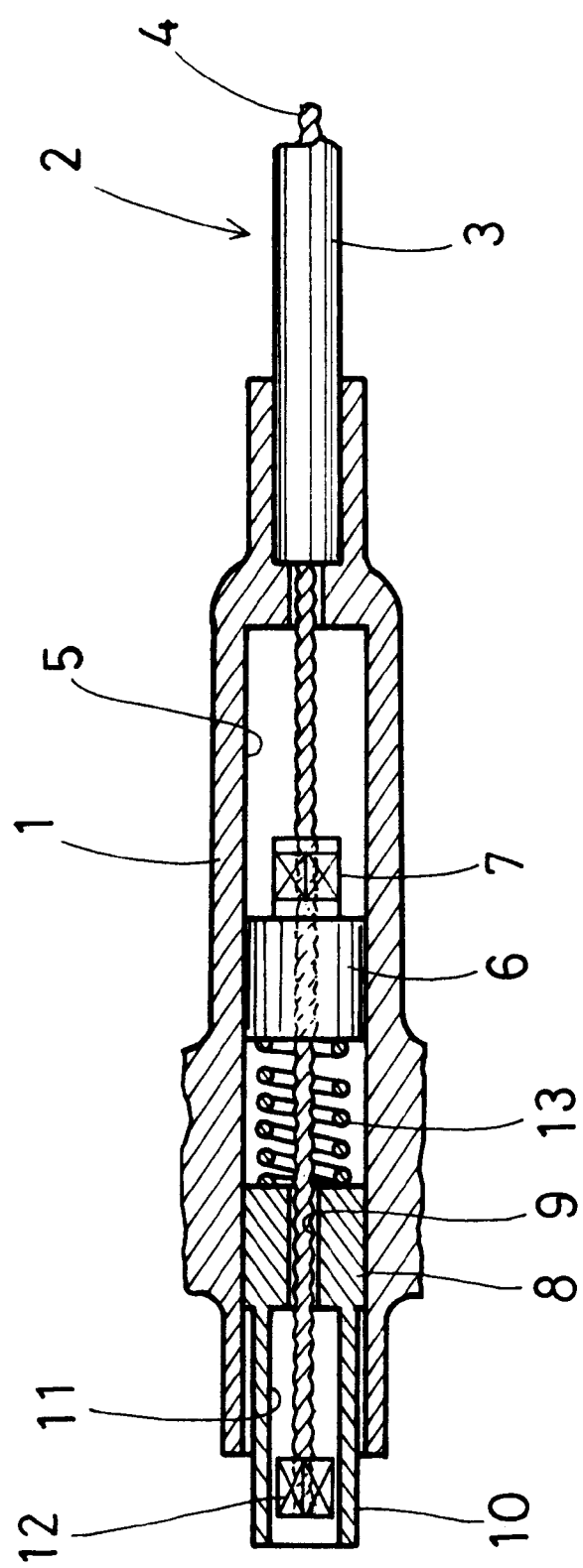
FIG. 2 is a view similar to FIG. 1 showing the same embodiment as being automatically set in standby/cancel mode.

A specific embodiment of the invention will be described in reference with the accompanying drawings.

As shown, a cylindrical casing cap 1 mounted on a stationary member (not shown) is immovably fitted on a proximate end of an outer casing 3 for a push-pull control cable device 2 which comprises said outer casing 3 and inner cable 4 slidably extending therethrough so as to transmit a controlling force in either of push and pull directions to the subsequent mechanism.

The casing cap 1 contains within a hollow cavity 5 thereof at its intermediate location an intermediate metallic block 6 caulked on the inner cable 4 by a diameter-reduce block 7 so that said metallic block 6 can be slidably moved along the hollow cavity 5. A manipulating member 8 centrally formed with an opening for passage of the inner cable 4 and including a cylindrical portion 10 of a slightly reduced diameter integrally extending rearward from the member 8 is slidably received by a proximate end of the hollow cavity 5. A proximate end of the inner cable 4 projects through the opening 9 into a hollow cavity 11 of the cylindrical portion 10 and is caulked by a terminal metallic block 12 so that the manipulating member 8 is normally biased by a coil spring 13 disposed between the intermediate metallic block 6 and the manipulating member 8 against the terminal metallic block 12.

With this embodiment constructed as has been described above, if the other end (not shown) of the inner cable 4 is being subjected to a negligible resistance, depression of the manipulating member 8 into the cavity 5 will cause the coil spring 13 to be slightly compressed so as to push the intermediate metallic block 6 and thereby to move the inner cable 4 coupled integrally to this block 6 in a direction as indicated by an arrow in FIG. 1.

As soon as the manipulating member 8 is released from a depressing force, said member 8 restores its initial position shown in FIG. 1 under the effect of a return spring (not shown) carried by the other end of the inner cable 4.

Even if the manipulating member 8 is depressed into the cavity 5, both the inner cable 4 and the intermediate metallic block 6 fixed thereto will not be moved and the amount by which the manipulating member 8 is depressed will be sufficiently absorbed by compression of the coil spring 13 to neutralize the effect which otherwise would result from depression of the manipulating member 8, so long as the other end of the inner cable 4 is bearing against the stationary member (not shown) or being subjected to a relatively high resistance.

What is claimed is:

1. Mechanism for automatically setting a push-pull control cable device in an operational standby mode or a cancel mode, the push-pull control device having an outer casing, said mechanism comprising:

a tubular casing cap having an end mounted in use on said push-pull control device outer casing fixed stationary relative thereto;

said tubular casing cap having an inner cable extending longitudinally in the tubular casing cap for axial guided travel therein and extending into said outer casing tube for transmitting a control force to the push-pull control device alternatively in a push direction or a pull direction;

a manipulating member slidable axially in the casing cap and disposed at an end thereof opposite the end mounted on said outer casing;

said manipulating member having a tubular portion of reduced diameter extending axially from said opposite end of said tubular casing cap for selectively depressing the manipulating member to apply a push control force or pulling it axially to apply a pull control force to the cable control device;

said inner cable extending longitudinally slidable axially through said manipulating member and into said tubular portion and having a terminal end in said tubular portion;

a terminal block slidable axially in the tubular portion and fixed to said terminal end of said inner cable;

an intermediate block slidable axially in said tubular casing cap and fixed to said inner cable axially spaced from said manipulating member;

a compressible coil spring disposed between the intermediate block and said manipulating member and in an extended state biasing the intermediate block in a direction for causing the inner cable to slide the terminal block toward and against the manipulating member in readiness for depression of the manipulating member to apply a push control force to the cable control device in the absence of a resistance force in the cable control device resisting axial travel of the inner cable when the manipulating member is depressed, and when the inner cable is subjected to a resistance force in the cable control device of a predetermined magnitude depressing of the manipulating member compresses the coil spring and the depression of the manipulating member is ineffective to apply a push control force and is thereby canceled.

2. Mechanism according to claim 1, including means for selectively fixing the intermediate block on said control cable at selected different longitudinal positions thereon for providing different stroke lengths of the inner cable effected when the manipulating member is depressed or pulled axially.

* * * * *